United States Patent [19]

Worley

[11] 4,351,361

[45] Sep. 28, 1982

[54] VALVE WITH SPRING GATE

[75] Inventor: Arthur C. Worley, Mendham, N.J.

[73] Assignee: Exxon Research and Engineering Co., Florham Park, N.J.

[21] Appl. No.: 881,557

[22] Filed: Feb. 27, 1978

Related U.S. Application Data

[63] Continuation of Ser. No. 726,488, Sep. 24, 1976, abandoned, which is a continuation of Ser. No. 559,314, Mar. 17, 1975, abandoned.

[51] Int. Cl.$^3$ .......................... F16K 1/18; F16K 11/02
[52] U.S. Cl. ............................... 137/625.44; 137/375; 137/875; 251/298; 251/359
[58] Field of Search .................... 137/375, 625.44, 875; 251/298, 334, 359

[56] References Cited

U.S. PATENT DOCUMENTS

| | | | |
|---|---|---|---|
| 271,491 | 1/1883 | Martin | 137/625.44 |
| 1,847,385 | 3/1932 | Dengler | 251/334 X |
| 2,244,986 | 6/1941 | Drane | 137/612 X |
| 3,498,327 | 3/1970 | Dicken | 137/625.44 |
| 3,521,659 | 7/1970 | Seger | 251/334 X |
| 3,592,221 | 7/1971 | Worley et al. | 137/625.44 X |
| 3,834,662 | 9/1974 | Huntington | 251/121 |

Primary Examiner—Gerald A. Michalsky
Attorney, Agent, or Firm—F. Donald Paris

[57] ABSTRACT

A valve which has a gate of springy sheet material pressing at its peripheral region against an endless valve seat when the valve is in a closed position. The endless valve seat has a seating surface situated in a predetermined plane generally perpendicular to the direction of fluid flow through an opening defined by the endless valve seat. The gate of springy sheet material is of a dished configuration and has a hollow interior directed toward the opening defined by the endless valve seat when the valve is in a closed position. The dished springy sheet material which forms the movable gate of the valve has a central region situated upstream of the plane in which the seating surface is located, when the valve is closed, and a springy endless peripheral region situated in the plane of the seating surface in engagement with the latter when the valve is closed. When the dished member which forms the gate is in an unstressed condition, its central region and the peripheral region are spaced from each other in the direction of fluid flow through a distance greater than the distance in the direction of fluid flow when the valve is closed so that the spring force of the springy dished member urges the peripheral region thereof against the seating surface when the valve is closed, a suitable structure being connected to the gate in order to move it between its closed and open positions.

6 Claims, 8 Drawing Figures

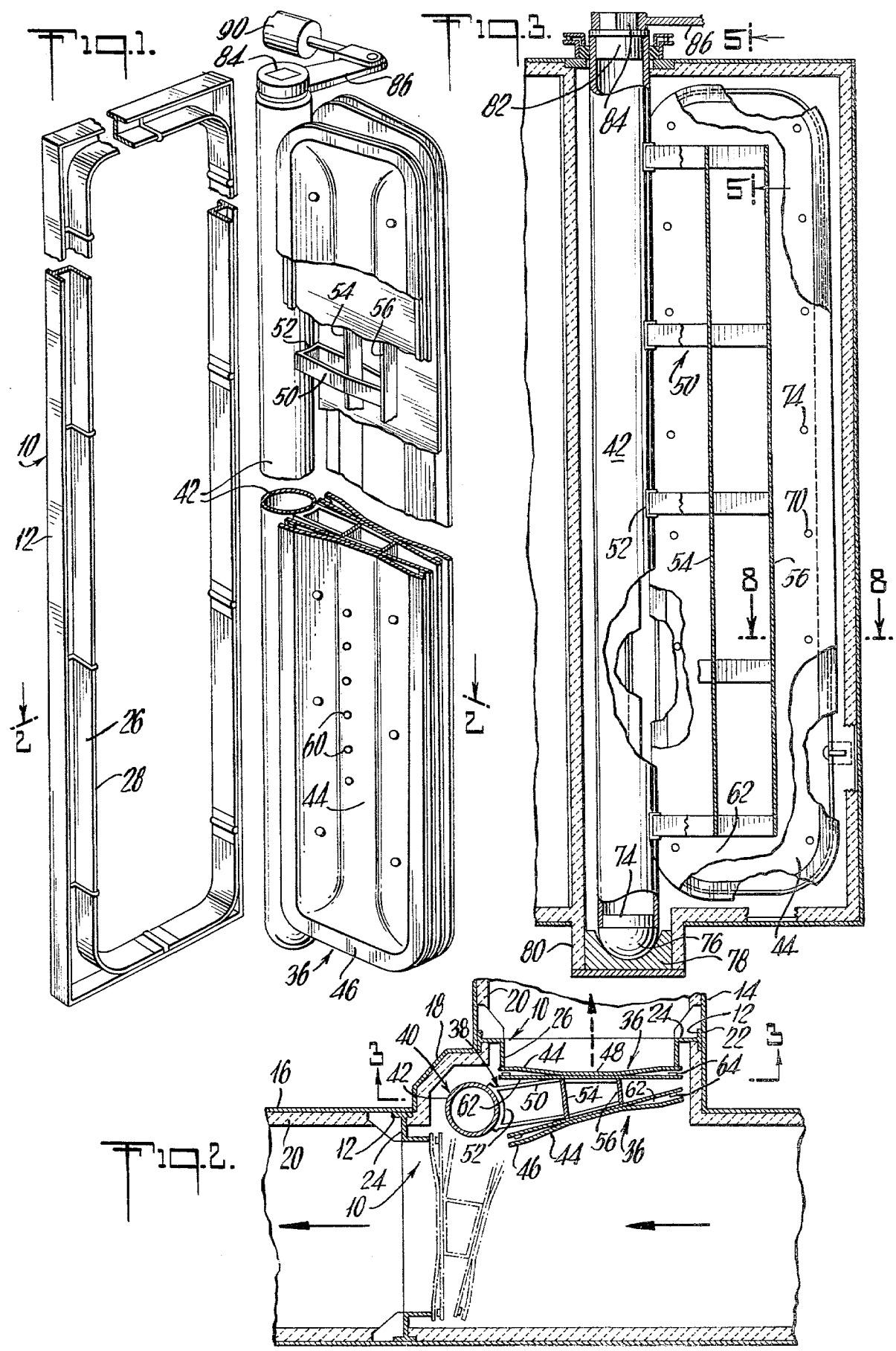

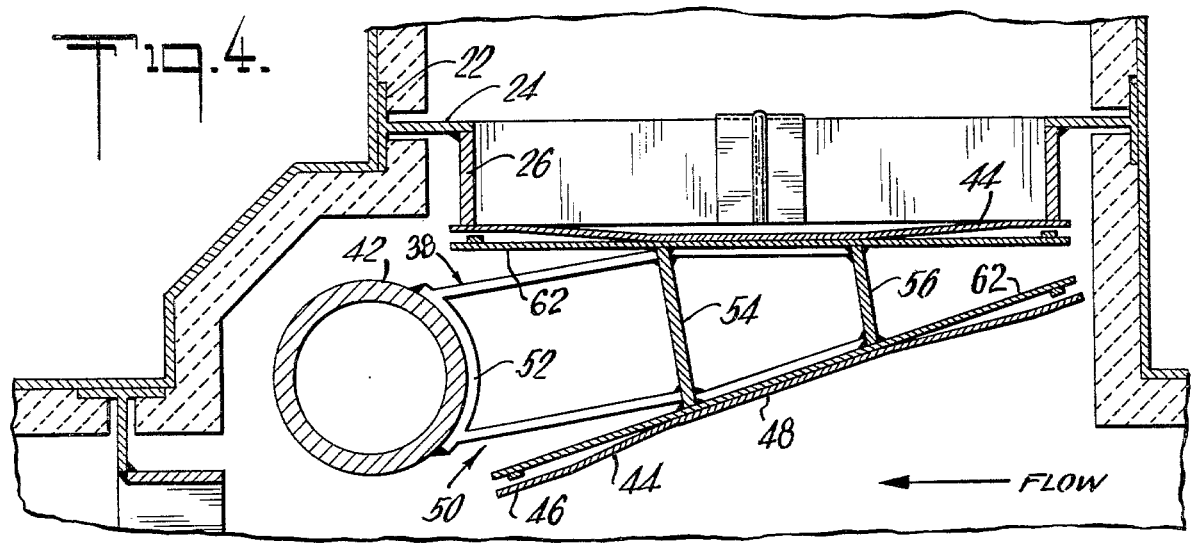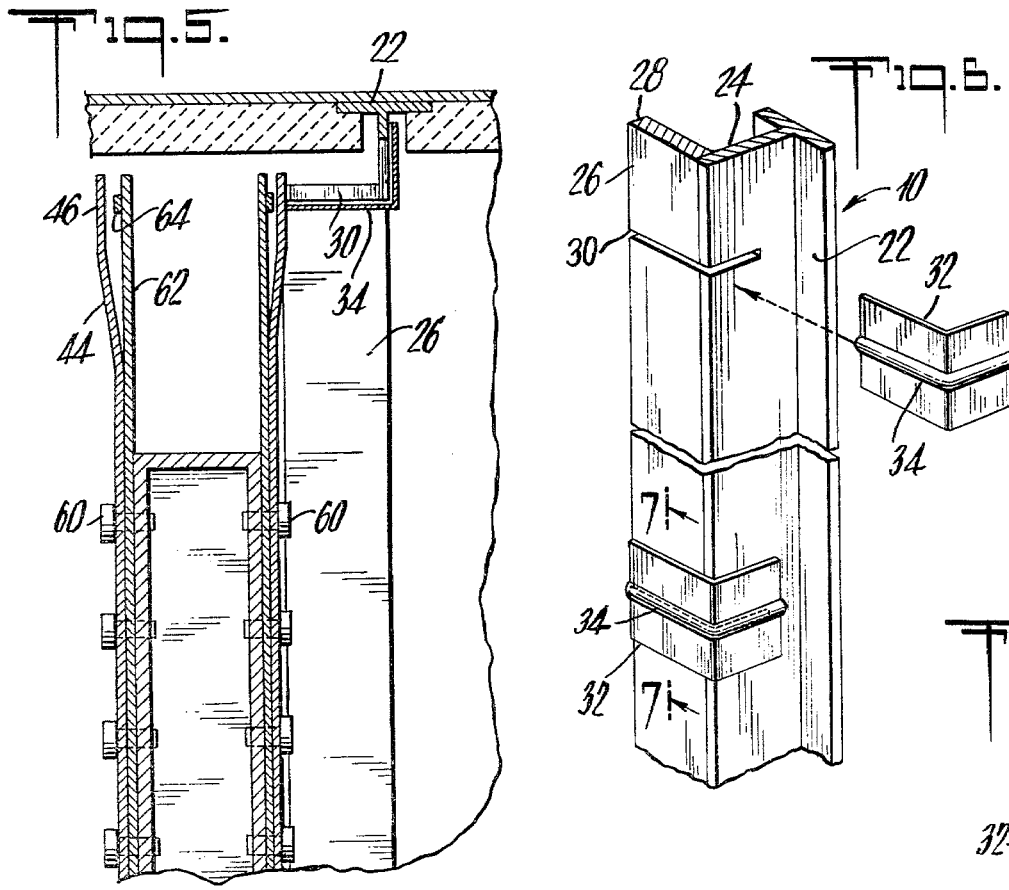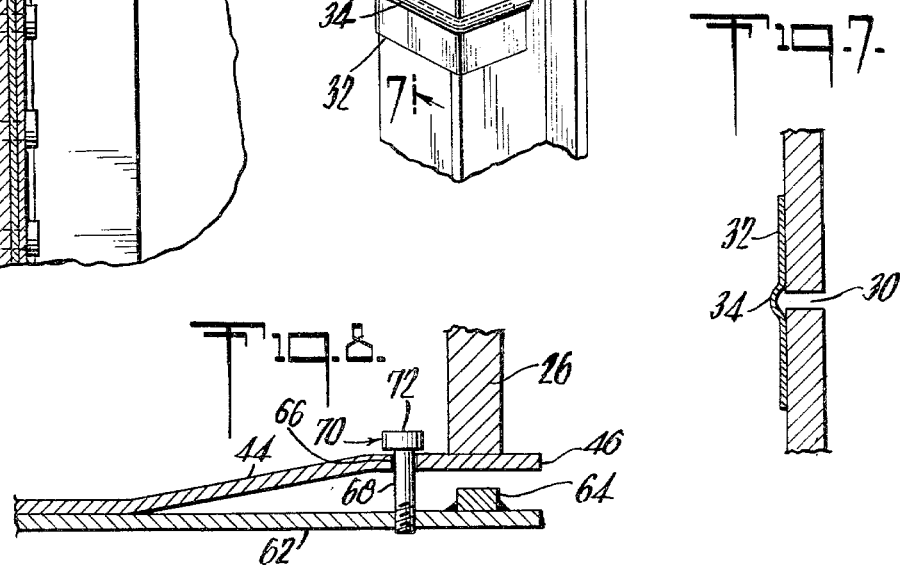

VALVE WITH SPRING GATE

This is a continuation of application Ser. No. 726,488, filed Sept. 24, 1976, now abandoned, which is a continuation of application Ser. No. 559,314, filed Mar. 17, 1975, now abandoned.

BACKGROUND OF THE INVENTION

The present invention relates to valves.

In particular, the present invention relates to fairly large valves having one inlet port and two outlet ports capable of controlling the flow of a fluid such as a gas through relatively large ducts. For example, the present invention may be used in connection with turbines such as gas turbines in order to control the flow of the exhaust of a gas turbine either through a steam generator or to a bypass stack.

Although installations of the above type do not necessarily operate at very large pressures, they do operate at relatively high temperatures, and considerable problems are encountered in providing valves which can be effectively operated so as to reliably close ducts through which a gas flows. Such ducts may be, for example, of a rectangular configuration having a long dimension on the order of 12 feet and a transverse dimension of between 2 and 3 feet, for example, so that a relatively large amount of flue gas may be handled in such a duct. The temperatures which are encountered in such installations may be on the order of 1000° F.

With installations of the above general type considerable problems are encountered in controlling the flow of a fluid through the duct inasmuch as the closure must be maintained over a long distance and in view of the relatively high temmperatures it is difficult to provide a reliable seal with the large temperature range which is encountered. If, for example, reliance is made upon relatively soft material to achieve the required seal, such a material requires frequent replacement as well as a complex method of attachment, such as the requirement of removing and replacing a large number of bolts. Moreover, conventional valves to serve purposes as set forth above have complex power-operated mechanisms for opening and closing the valves, and these mechanisms for operating the valve between its open and closed positions involve a further disadvantage in the structure.

SUMMARY OF THE INVENTION

It is accordingly a primary object of the present invention to provide a valve which will avoid drawbacks as set forth above.

Thus, it is an object of the present invention to provide a valve which is capable of achieving the required seal over an extremely long endless path without using soft material for sealing purposes so that all of the disadvantages involved in the use of such a soft material are eliminated.

Furthermore, it is an object of the present invention to provide a valve of the above general type which will operate very reliably with a structure which is capable of easily and effectively moving the valve between its open and closed positions without a large number of complications in the mechanism which displaces the valve between its open and closed positions.

Furthermore, it is an object of the present invention to provide a valve which is extremely safe in that at no time does the valve completely block the flow of fluid.

Furthermore, it is an object of the present invention to provide a valve of the above general type which even though it is relatively large nevertheless is capable of being closed and opened rapidly as a result of the simple manner in which the valve is actuated in accordance with the present invention.

Also, it is an object of the present invention to provide a valve of the above general type which is simple in its construction and of a low cost while at the same time requiring minimum maintenance during a long operating life.

According to the invention, the valve comprises an endless valve seat means which has an outer fastening region adapted to be fastened to the inner or outer surface of a duct through which a fluid is adapted to flow, the valve seat means having an inner seat region situated inwardly of its outer fastening region and terminating in an endless seating surface located in a predetermined plane which is generally perpendicular to the direction of fluid flow through the duct, so that the seating surface defines an opening through which the fluid is adapted to flow. A valve closure means has a closed position engaging the above seating surface and closing the opening defined thereby. This valve closure means includes a dished member of springy sheet materials having a hollow interior directed toward the opening defined by the seating surface in the closed position of the closure means. This dished springy member has a central region situated upstream of the plane in which the seating surface is located and a springy endless peripheral region situated in the latter plane in engagement with the seating surface when the closure means is in its closed position. The springy endless peripheral region of the dished member is situated, in the unstressed condition of the dished member, in a plane which is located at a given distance from the central region of the dished member. A moving means is operatively connected to the dished member of the springy sheet material for moving the latter from an open position displaced away from the above opening to a closed position where the peripheral region of the dished member engages the seating surface and is located closer to the central region of the dished member than the above distance in the unstressed condition of the dished member, so that when the valve is closed the springy peripheral region of the dished member presses against the seating surface.

BRIEF DESCRIPTION OF DRAWINGS

The invention is illustrated, by way of example, in the accompanying drawings which form part of this application and in which:

FIG. 1 is a fragmentary perspective illustration of one embodiment of a valve according to the present invention with a body including internal thermal insulation;

FIG. 2 is a fragmentary sectional plan view taken along line 2—2 of FIG. 1 showing in addition parts of the ducts which are provided with the valve structure of the invention;

FIG. 3 is a partly broken away sectional elevation of the valve of the invention taken along line 3—3 of FIG. 2;

FIG. 4 shows part of the structure of FIG. 2 in an enlarged scale, as compared to FIG. 2, in order to illustrate more clearly further details of the structure;

FIG. 5 is a fragmentary sectional elevation, taken along line 5—5 of FIG. 3 showing the structure at an enlarged scale, as compared to FIG. 3 with additional details being illustrated in FIG. 5;

FIG. 6 is a fragmentary partly exploded perspective illustration of a valve seat means of the invention;

FIG. 7 is a fragmentary sectional elevation taken along line 7—7 of FIG. 6 in the direction of the arrows; and FIG. 8 is a fragmentary sectional plan view taken along line 8—8 of FIG. 3 in the direction of the arrows and showing the dished member edge limiting means of the valve of the invention.

DESCRIPTION OF PREFERRED EMBODIMENTS

The valve of the invention includes an endless valve seat means 10 which is illustrated at the left of FIG. 1. This endless valve seat means 10 has an outer fastening region 12 which is adapted to be fastened to the inner surface of a duct through which a fluid is adapted to flow. Thus, FIG. 2 shows in the particular installation illustrated therein a pair of valve seat means 10 having their outer fastening regions 12 fastened in any suitable way to the inner surface of a pair of ducts 14 and 16 which are interconnected at a corner region 18. As is apparent from FIG. 2, the inner surfaces of the ducts 14, 16 and corner 18 are lined with a suitable thermal insulation 20 which may be of the refractory type. The valve seat means 10 has an outer flange 22 fixed directly to the inner surface of the wall of each duct 14 and 16 by suitable bolts, welding, or the like. This flange 22 is fixed with a web 24 which is perpendicular to the flange 22, so that this part of the structure forms an elongated T-bar structure. The inner peripheral edge region of the rectangular T-bar structure 22, 24 has fixed thereto, as by welding, for example, an elongated endless web 26 which extends perpendicular from the web 24 and terminates in what may be considered an endless seating surface 28. The configuration of the endless seating surface 28 is clearly apparent from FIG. 1 where it is indicated that the web 26 has rounded corners.

The construction of the valve seat means 10 is most clearly apparent from FIGS. 4-7. As has been indicated above, the valve of the invention is adapted to operate at temperatures which are on the order of 1000° F. For example, the valve of the invention may operate at a temperature range in a specific installation of from ambient all the way up to 1200° F. Thus, allowance must be made for expansion and contraction, particularly in view of the large dimensions, which, as has been indicated above, may be on the order of a height of 12 feet and a width of between 2 and 3 feet or even greater. In the illustrated internal insulated valve example in order to compensate for differential thermal expansion between the relatively cool outside walls of the valve body and ducts and the hot valve seat, the webs 24 and 26 are formed with a series of slits 30 distributed therealong, as indicated most clearly in FIG. 6 and FIG. 7. These slits 30 are in turn covered by a flexible sheet material 32. Thus, the sheet material 32 may take the form of any suitable metal foil in the form of a thin flexible sheet material which is welded to the webs 24 and 26, bridging the slits 30 thereof, in the manner shown most clearly in FIGS. 6 and 7. At this portion which is situated in line with a slit 30, each cover element 32 has a bulging region 34 capable of yielding during expansion and resuming a more pronounced bulge configuration during contraction, so that in this way while a seal is maintained at the slits 30 nevertheless the structure is capable of expanding and contracting due to temperature fluctuations.

Those skilled in the art will readily appreciate that if it is desirable or necessary to locate the thermal insulation on the exterior of the valve and duct, very little temperature difference will be present between the valve body and seat, and the need for slits 30 and covers 32 will be eliminated.

Thus, it will be seen that the seating surface 28 of each of the valve means 10 illustrated in FIG. 2 is located generally in a plane which is perpendicular to the direction of fluid flow. In the particular example illustrated in FIG. 2, the duct 14 may be a duct for leading exhaust gas from a gas turbine to a boiler, while the duct 16 may be a duct for leading the exhaust gas from the turbine to vent through a suitable stack. Thus it will be seen that the endless seating surface 28 of each valve means 10 defines an opening through which the fluid is adapted to flow.

A valve closure means 36 is provided to cooperate with each valve seat means 10 at the seating surface 28 thereof. Thus, in the particular example illustrated in FIG. 2 there are a pair of valve closure means 36 for respectively cooperating with the pair of valve seat means 10. The pair of valve closure means 36 are carried by a suitable door frame 38 forming part of a moving means 40 which includes a hollow rotary shaft 42 which fixedly carries the frame 38 in a manner described in greater detail below.

Each valve closure means 36 includes a dished springy member 44 made of a springy sheet metal and having a springy endless peripheral region 46 which cooperates with the seating surface 28. The peripheral region 46 may be integral with and form part of the remainder of the springy dished member 44 or it may be in the form of a separate strip fastened as by welding along the edge of the body of sheet metal which forms the remainder of the springy dished member 46. The closure means 36 which cooperates with the seat means 10 fixed to the duct 14 is shown in its closed position in FIG. 2, from which it is apparent that in the closed position of the valve the hollow interior of the dished member 44 is situated upstream of the opening defined by the surface 28. Inwardly of its peripheral region 46 the dished member 44 has a central region 48. The central region 48 is situated from the plane of the peripheral region 46 by a distance, when the closure means 36 is not stressed, greater than this distance when the closure means 36 is in its closed position, so that in this way the peripheral region 46 presses with the springy force of the springy sheet material against the seating surface 28 so as to provide a reliable tight closure. Of course the peripheral region 46 conforms to the configuration of the endless seating surface 28 and is situated in a plane perpendicular to the plane of the web 26 pressing against the surface 28 when the closure means 36 is in its closed position.

The frame 38 includes a plurality of frame units 50 projecting radially from the hollow rotary shaft 42 and having fixed to the latter end strip members 52 of an arcuate configuration. These members 52 may be welded or otherwise fastened to the hollow shaft 42 while the radially extending frame units 50 may be made up of suitably shaped bars which may be welded together, for example.

The several frame units 50 which are distributed along the shaft 42 in the manner shown most clearly in FIG. 3 are interconnected by a pair of vertically disposed elongated strips 54 and 56 which extend between and are welded to the frame units 50 in the manner shown most clearly in FIG. 3. The pair of springy dished members 44 of the pair of closure means 36 are bolted directly to these rectangular frame works as by a series of bolts 60 some of which are indicated in FIG. 1.

However, between each springy dished member 44 and the frame 38 there is a back-up sheet member 62 situated behind the entire dished member 44, although in the illustrated example the portions of the corner regions of the back-up sheet member 62 are broken away for purposes of clarity.

Behind the peripheral sealing region 46 of the springy dished member 44 the back-up sheet member 62 carries a plurality of limiting projections 64 which are in line with the sealing surface 28 when the closure means 36 is in a closed position. Thus, it will be seen that the deflection or stressing of the springy dished member 44 at its peripheral region 46 can take place only until the limiting means 64 comes into engagement with the peripheral region 46, so that with this construction after deflection of the springy gate has taken place through a given extent the limiting means 64 will limit further deflection and will positively press the peripheral region 46 against the surface 28.

A second limiting means is provided to limit the movement of the peripheral region 46 in the opposite direction away from the back-up sheet 62. Thus, as may be seen from FIG. 8 the sheet 44 is provided inwardly of but adjacent the peripheral region 46 with a series of openings 66. The shanks 68 of a plurality of bolts 70 extend through the openings 66, these bolts 68 fastened to the back-up sheet 62 in the manner shown in FIG. 8. The bolts 70 have heads 72 larger than the openings 66. Thus, with this arrangement if due to thermal stressing or the like there should be any tendency for the peripheral region 46 to become undesirably warped and to move undesirably away from the back-up sheet 62, the limiting means formed by the bolts 70 will limit the extent of such deformation of the springy gate 44. Thus, with this arrangement, the edge 46 of the sheet 44 will become situated against the inner surface of the web 26, and a reliable operation of the valve is assured under even the most extreme operating conditions. The limiting function of belt head 72 is also effective to prevent any adverse outward deflections of the edge 46 that is not in seating engagement with an edge 28 and therefore subject to the direct high velocity gas flows in the duct.

As was indicated above, the moving means 40 includes the elongated hollow shaft 42, the axis of which defines the axis around which the closure means turns between its alternate closed positions in the ductwork. The elongated hollow shaft 42 fixedly carries at its bottom end a plug 74 (FIG. 3) which has a downwardly directed convex spherical surface 76 received in a correspondingly shaped concave surface of a block 78 supported in a suitable frame 80, so that as a result of this simple construction the entire weight and moments of the assembly is carried by the block 78 while at the same time the shaft 42 can freely turn around its axis.

At its top end the shaft 42 carries a further plug 82 which is fixed in any suitable way to the shaft 42 and which has an exposed non-circular portion 84 of square cross section, for example, adapted to be fixed with a lever 86 which provides the turning of the shaft 42 about its axis. The shaft 42 is supported at its upper end in a suitable bearing 88 carried by the structure which interconnects the ducts 14 and 16. The lever 86 may be operatively connected with any suitable actuating mechanism such as a hydraulic actuating mechanism 90 shown schematically in FIG. 1 or even more preferably through a rack and pinion gear fitted to the top end of shaft 42 in place of the levers 86.

While in the embodiment of the invention shown the shaft 42 is primarily intended to be oriented in a vertical position, those skilled in the art will readily appreciate many alternate bearing arrangements for rotatably supporting this shaft in different positions. For instance, if desired the lower end of shaft 42 could be extended to outside the duct with provision made for a further rack and pinion to operate the valve if additional driving torque for proper seating was necessary.

Thus, with the above extremely simple rugged structure it is possible to rapidly swing each closure 36 between its closed and open positions, and furthermore when one of the ducts 14 is closed the other duct 16 is necessarily open, so that at no time is the exhaust completely blocked, achieving in this way a safe operation for the arrangement of the invention. If desired, the valve could also be positioned mid-way between the seats to allow fluid flow through both outlet ducts.

In addition, it will be noted that the sides of the pair of valve closure means 36 which are distant from the shaft 42 are closer to each other than their sides which are situated adjacent to the shaft 42. This inclined arrangement of the pair of closure means 36 is particularly apparent from FIGS. 3 and 4. Thus, it will be seen that the radially extending units 50 of the frame 38 terminate in elongated portions which converge toward each other so that the pair of valve closures 36 are mounted with respect to each other in the converging manner shown in FIGS. 2 and 4. Furthermore, it will be seen that when the moving means 40 is actuated to close one of the valve ports and open the other valve port, the shaft 42 is turned through an angle which is somewhat greater than 90°. As a result of this arrangement it becomes possible to reliably situate each valve closure means 36 properly seated against a seating surface 28.

As is apparent from the above description, with each valve disclosed above, the gate acts in a manner similar to a door seating against a jamb. The seating surface 28, which corresponds to the jamb, is accurately fabricated and thermally stable so as to insure contact with the springy peripheral region of the springy swingable gate along the entire periphery thereof. The ducts are thermally insulated at their internal surface to reduce the metal temperature of the duct. Of course, when the springy peripheral region of the gate engages the seating surface the gate is elastically deflected, and the springy structure is capable of compensating for variations in the fixed seat height by deflection of the springy peripheral region of the gate. The torque which is applied through the rotary shaft of the moving means is sufficient to deflect the springy sheet material within the elastic limit of the springy metal. Usually, the seating force required for metal-to-metal seating will be 2-6 times that force which would be developed by the differential pressure acting on the springy gate when in contact with the seating surface 28 by the fluid in the duct system. The springy dished member 44 is normally arranged so that the force due to differential pressure acting thereon by the fluid in the duct is in the same direction as the externally applied seating force.

This metal-to-metal seating provides an extremely durable valve structure, as contrasted with soft-seating arrangements which require frequent replacement and complex methods of attachment.

Moreover, as was pointed out above, the spring type of valve structure compensates for slight fixed-seat distortion due to temperature fluctuations which may exist particularly when the valve is closed. Furthermore, the simple rotary movement between only slightly more than 90° as described above in order to close one valve and open the other lends itself to a simple rack and pinion or other operating mechanism, as described above, thus enabling a fast closure or opening rate to be achieved through this simple valve actuation. Thus, the structure of the invention is low in cost and simple in its construction, requiring minimum maintenance while at the same time being extremely safe because at all times at least one of the ducts described above is open.

What is claimed is:

1. A valve comprising endless valve seat means having an outer fastening region adapted to be fastened to the surface of a duct through which a fluid is adapted to flow in a predetermined direction and an inner seat region situated inwardly of said outer fastening region and terminating in an endless seating surface located in a predetermined plane generally perpendicular to the direction of fluid flow through the duct, so that said seating surface defines an opening through which the fluid is adapted to flow, valve closure means having a closed position engaging said seating surface and closing said opening defined thereby, said valve closure means including a dished member of springy sheet material having a hollow interior directed toward said opening defined by said seating surface in the closed position of said closure means, said dished springy member having a central region situated upstream of said plane and a springy endless peripheral region situated in said plane in engagement with said seating surface when said closure means is in said closed position thereof, said springy endless peripheral region being situated, in the unstressed condition of said springy sheet material, in a plane located at a given distance from the central region of said dished member, seat means being formed at least in the region of said seating surface with a plurality of slits distributed along and extending inwardly from said seating surface so that said seat means is free to contract and expand at said slits, and a plurality of covering sheet members fixed to said seat means and bridging said slits thereof with said covering sheet members having curved portions extending across said slits to accommodate expansion and contraction of said seat means, and moving means operatively connected to said dished member of springy sheet material for moving the latter from an open position displaced away from said opening to a closed position where said peripheral region engages said seating surface and is located closer to said central region than said given distance so that said springy peripheral region presses against said seating surface in the closed position of said closure means.

2. A valve for use in high temperature service comprising in combination: endless valve seat means having an outer fastening region fastened to the surface of a duct through which a fluid is adapted to flow in a predetermined direction and an inner seat region situated inwardly of said outer fastening region and terminating in an endless rigid metal seating surface located in a predetermined plane generally perpendicular to the direction of fluid flow through the duct, so that said seating surface defines an opening through which the fluid is adapted to flow, said seat means being formed at least in the region of said seating surface with a plurality of slits distributed along and extending inwardly from said seating surface so that said seat means is free to contract and expand at said slits, and a plurality of covering sheet members fixed to said seat means and bridging said slits thereof with said covering sheet members having curved portions extending across said slits to accommodate expansion and contraction of said seat means, valve closure means having an open position and a closed position engaging said seating surface and closing said opening defined thereby, said valve closure means including a dished member of springy sheet material having a hollow interior directed toward said opening defined by said seating surface in the closed position of said closure means, said dished springy member having a central region situated upstream of said plane and a springy endless metal peripheral region situated in said plane in engagement with said metal seating surface when said closure means is in said closed position thereof thereby forming a metal-to-metal seating relationship, said springy endless metal peripheral region being situated, in the unstressed condition of said springy sheet material and open position of said dished member, in a plane located at a given distance from the central region of said dished member, and moving means including a movable frame means operatively rigidly connected to said central region of said dished member of springy sheet material for moving the latter about a turning axis from said open position displaced away from said opening to said closed position where said metal peripheral region engages said metal seating surface and is located closer to said central region than said given distance so that said springy metal peripheral region presses against said metal seating surface in the closed position of said closure means.

3. A valve for use in high temperature service comprising in combination: endless valve seat means having an outer fastening region fastened to the surface of a duct through which a fluid is adapted to flow in a predetermined direction and an inner seat region situated inwardly of said outer fastening region and terminating in an endless rigid metal seating surface located in a predetermined plane generally perpendicular to the direction of fluid flow through the duct, so that said seating surface defines an opening through which the fluid is adapted to flow, valve closure means having an open position and a closed position engaging said seating surface and closing said opening defined thereby, said valve closure means including a dished member of springy sheet material having a hollow interior directed toward said opening defined by said seating surface in the closed position of said closure means, said dished springy member having a central region situated upstream of said plane and a springy endless metal peripheral region situated in said plane in engagement with said metal seating surface when said closure means is in said closed position thereof thereby forming a metal-to-metal seating relationship, said springy endless metal peripheral region being situated, in the unstressed condition of said springy sheet material and open position of said dished member, in a plane located at a given distance from the central region of said dished member, and moving means including a movable frame means operatively rigidly connected to said central region of said dished member of springy sheet material for moving the latter about a turning axis from said open position displaced away from said opening to said closed position where said metal peripheral region engages said metal seating surface and is located closer to said central region than said given distance so that said springy metal peripheral region presses against said metal seating surface in the closed position of said closure means, and a backup sheet member fixed between said frame and said dished member and carrying behind said peripheral region of said dished member first limiting means for limiting the extent of deflection thereof and second limiting means cooperating said peripheral region of said springy dished member for limiting movement thereof away from said backup sheet, said second limiting means including a plurality of bolts respectively fixed to said backup sheet, said peripheral region of said springy dished member being formed with openings through which shanks of said bolts extend, and said bolts respectively having heads larger than the latter openings and situated at the side of said peripheral region opposite from said backup sheet.

4. A valve for use in high temperature service comprising in combination: endless valve seat means having an outer fastening region fastened to the surface of a duct through which a fluid is adapted to flow in a predetermined direction and an inner seat region situated inwardly of said outer fastening region and terminating in an endless rigid metal seating surface located in a predetermined plane generally perpendicular to the direction of fluid flow through the duct, so that said seating surface defines an opening through which the fluid is adapted to flow, valve closure means having an open position and a closed position engaging said seating surface and closing said opening defined thereby, said valve closure means including a dished member of springy sheet material having a hollow interior directed toward said opening defined by said seating surface in the closed position of said closure means, said dished springy member having a central region situated upstream of said plane and a springy endless metal peripheral region situated in said plane in engagement with said metal seating surface when said closure means is in said closed position thereof thereby forming a metal-to-metal seating relationship, said springy endless metal peripheral region being situated, in the unstressed condition of said springy sheet material and open position of said dished member, in a plane located at a given distance from the central region of said dished member, and moving means including a movable frame means operatively rigidly connected to said central region of said dished member of springy sheet material for moving the latter about a turning axis from said open position displaced away from said opening to said closed position where said metal peripheral region engages said metal seating surface and is located closer to said central region than said given distance so that said springy metal peripheral region presses against said metal seating surface in the closed position of said closure means, and said moving means including a rotary shaft whose axis coincides with said turning axis, and said frame extends substantially radially from and fixed to said shaft and fixed to said central region of said springy dished member, said frame having a side directed away from said dished springy member and fixedly carrying a second springy dished member identical with said first-mentioned springy dished member, and a second valve seat means identical with said first-mentioned valve seat means situated in and fixed to a second duct in position to be engaged by said second springy dished member when said first-mentioned member is in said open position thereof, so that a fluid may be selectively directed to one or the other of the ducts which respectively carry the first and second valve seat means, said first and second valve seat means respectively having said seating surfaces thereof situated in planes which are at substantially right angles to each other and said frame means having mutually inclined surfaces to which said first and second springy dished members are connected, said inclined surfaces situating edge regions of said dished members distant from said axis closer to each other than edge regions thereof which are nearer to said axis and said shaft being turnable about its axis through somewhat more than 90° for locating said pair of said first and second springy dished members respectively in closed positions respectively engaging such seating surfaces.

5. A valve for use in high temperature service comprising in combination: endless valve seat means having an outer fastening region fastened to the surface of the duct through which a fluid is adapted to flow in a predetermined direction and an inner seat region situated inwardly of said outer fastening region and terminating in an endless rigid metal seating surface located in a predetermined plane generally perpendicular to the direction of fluid flow through the duct, so that said seating surface defines an opening through which the fluid is adapted to flow, said seat means including at least in the region of said metal seating surface a plurality of covered slits distributed along said metal seating surface for accommodating expansion and contraction of said seat means, valve closure means having an open position and a closed position engaging said seating surface and closing said opening defined thereby, said valve closure means including a dished member of springy sheet material having a hollow interior directed toward said opening defined by said seating surface in the closed position of said closure means, said dished springy member having a central region situated upstream of said plane and a springy endless metal peripheral region situated in said plane in engagement with said metal seating surface when said closure means is in said closed position thereof thereby forming a metal-to-metal seating relationship, said springy endless metal peripheral region being situated, in the unstressed condition of said springy sheet material and open position of said dished member, in a plane located at a given distance from the central region of said dished member, and moving means including a movable frame means operatively rigidly connected to said central region of said dished member of springy sheet material for moving the latter about a turning axis from said open position displaced away from said opening to said closed position where said metal peripheral region engages said metal seating surface and is located closer to said central region than said given distance so that said springy metal peripheral region presses against said metal seating surface in the closed position of said closure means.

6. A valve adapted for use in high temperature fluid flow service comprising in combination: first and second endless valve seat means having first and second outer fastening regions, respectively, fastened to the surfaces of said first and second ducts, respectively, through which fluid is adapted to flow in a predetermined direction, each of said valve seat means having an inner seat region situated inwardly of said outer fastening region and terminating in an endless rigid metal seating surface located in a predetermined plane generally perpendicular to the direction of fluid flow through said ducts, said first and second seat means each including in the region of said seating surface a plurality of spaced covered slits for accommodating expansion and contraction of said seat means and defining first and second openings through which the fluid is adapted to flow, first and second valve closure means each of which comprises a flexible member including a central region and a peripheral region, said peripheral region being offset with respect to said central region and comprising a flexible metal portion located closer to said plane than said central region and being disposed for engagement with a respective one of said first and second metal seating surfaces when said first and second valve closure means are in their closed position, said metal portion of said peripheral region being disposed in metal-to-metal contact with said metal seating surface when the corresponding one of said first and second valve closure means is in its closed position, first and second backup means disposed adjacent a respective one of said first and second flexible members on the side thereof opposite from the respective one of said first and second metal seating surfaces for controlling flexure of at least said metal portion of said peripheral region, and a support frame disposed between said first and second backup means of said first and second valve closure means and secured only at said central region of the corresponding one of said flexible members, and means operably connected with said frame for rotatably moving said valve closure means between opened and closed positions whereby a corresponding one of said metal portions of said peripheral regions of said first and second valve closure means engages a corresponding one of said first and second metal seating surfaces thereby to provide a metal-to-metal seal therebetween.

* * * * *